United States Patent [19]
Forkner et al.

[11] Patent Number: 5,751,870
[45] Date of Patent: May 12, 1998

[54] OPTICAL FIBER LENSED ILLUMINATION COUPLER

[75] Inventors: John F. Forkner, Laguna Beach; Andrew P. Riser, Menifee, both of Calif.; Ronald F. Rykowski, Woodinville, Wash.; Stephen S. Wilson, San Juan Capistrano, Calif.

[73] Assignee: Remote Source Lighting International, Inc., San Juan Capistrano, Calif.

[21] Appl. No.: 717,833

[22] Filed: Sep. 23, 1996

Related U.S. Application Data

[63] Continuation of Ser. No. 374,163, Jan. 17, 1995, Pat. No. 5,559,911.
[51] Int. Cl.$^6$ .................. G02B 6/32; F21V 7/04
[52] U.S. Cl. .................. 385/33; 385/31; 385/34; 385/38; 385/39; 385/901; 362/32
[58] Field of Search .................. 385/31, 33, 34, 385/39, 47, 88, 92, 93, 94, 900, 901, 38; 362/32, 61

[56] References Cited

U.S. PATENT DOCUMENTS

| | | | |
|---|---|---|---|
| 4,389,698 | 6/1983 | Cibie | 362/32 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/32 X |
| 4,851,969 | 7/1989 | Davenport et al. | 362/61 |
| 4,868,718 | 9/1989 | Davenport et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 5,222,793 | 6/1993 | Davenport et al. | 362/32 |

FOREIGN PATENT DOCUMENTS

| | | | |
|---|---|---|---|
| 2651283 | 5/1978 | Germany | 362/32 X |
| 2098311 | 11/1982 | United Kingdom | 385/901 X |

*Primary Examiner*—Brian Healy
*Attorney, Agent, or Firm*—Donald E. Stout; Kenton R. Mullins

[57] ABSTRACT

An optical fiber manifold is provided for coupling light from an illumination source to a plurality of spaced, large diameter output fibers, or "light pipes", which are used for a variety of purposes, such as illuminating pools, spas, hazardous material zones, jail cells, and other applications where direct lighting is dangerous, difficult to maintain, or subject to vandalism. The manifold comprises a light converging element, which may be either a lens or a reflector, for converging light separately on each of the spaced optical fibers. The light converging element is segmented, with each segment corresponding to one of the optical fibers, and is precise enough that substantially all of the convergent light is received by the respective cores of each of the spaced output fibers, thereby minimizing light loss.

24 Claims, 4 Drawing Sheets

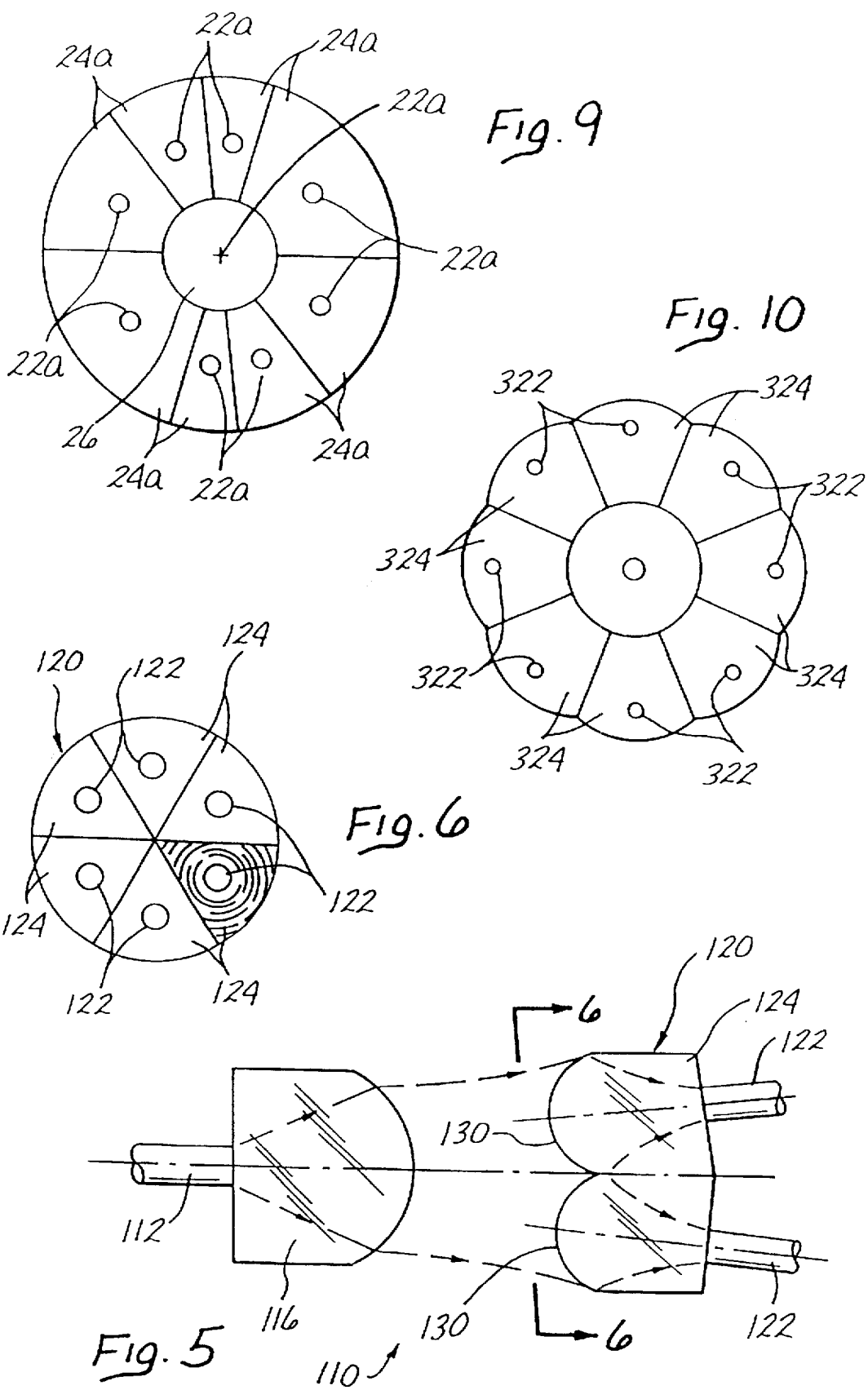

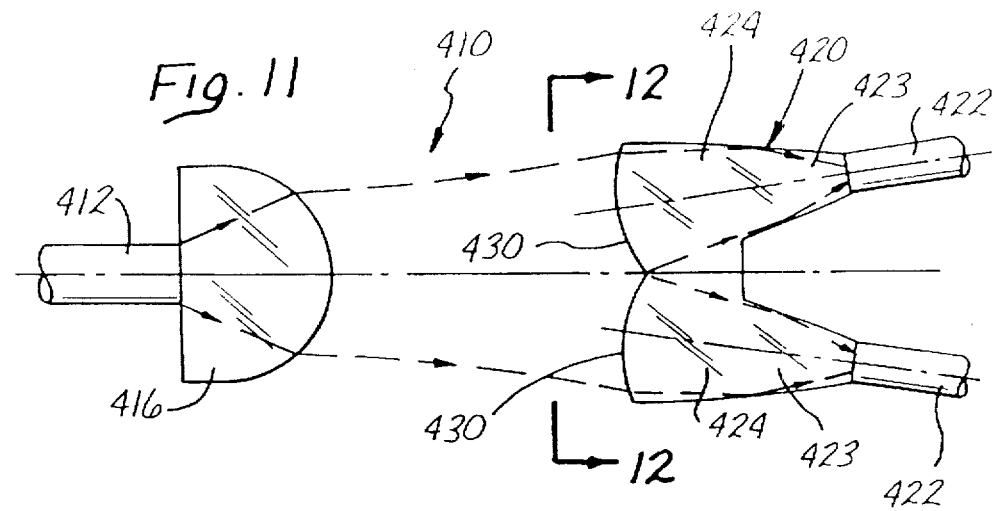
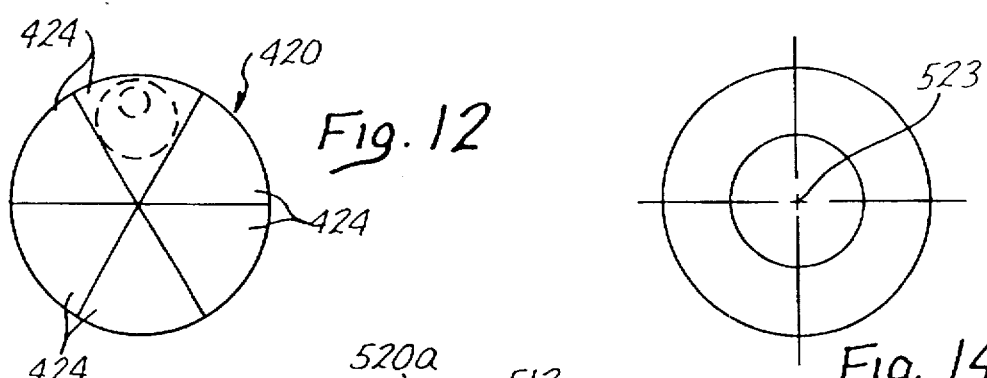
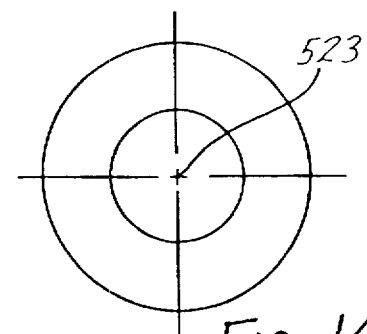
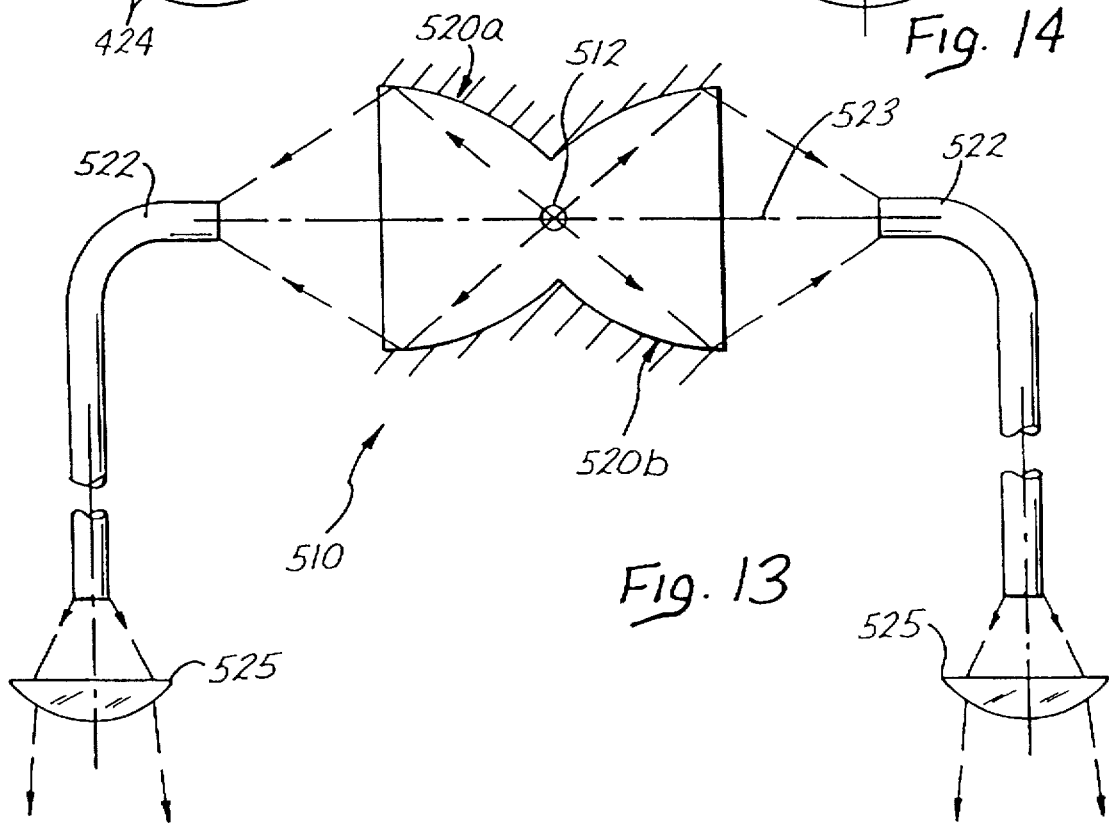

OPTICAL FIBER LENSED ILLUMINATION COUPLER

This is a continuation division of application Ser. No. 08/214,163 filed Jan. 17, 1995, now U.S. Pat. No. 5,559,911.

BACKGROUND OF THE INVENTION

Large diameter fiber optics, often referred to as "flexible light pipes", are well known in the art, and typically comprise a single, solid core fiber which is surrounded by a cladding layer and a sheath or shielding layer. The core is the portion of a light pipe which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter optical fibers, which are typically used to transmit information in relatively complex control systems, these large diameter "light pipes" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), or jail cells. They are particularly advantageous in that only a single centralized illumination system must be maintained, rather than a plurality of individual lights.

There are problems, however, in implementing state of the art light pipe illumination systems because of the difficulty of illuminating a plurality of light pipes from a single illumination source. In order to maximize efficiency, the optical fibers must be bundled as closely as possible, to ensure the maximum ratio of core area (the part of each light pipe which actually transmits light) to total area. However, bundling the large diameter light pipes together in order to illuminate them from the single illumination source is difficult to do efficiently. Each of the individual light pipes are round and thus have a great deal of space between them due to the cladding and shielding layers. This problem is illustrated in prior art FIG. 1, wherein a bundle 2 of large diameter optical fibers or light pipes 4 is shown. Each optical fiber 4 comprises a core 6, a cladding layer 7, and a shielding layer or sheath 8, as described above. To obtain maximum efficiency, it is desirable to illuminate only the core 6 of each of the bundled optical fibers 4, but this is impossible using state of the art bundling techniques. Necessarily, if the light from the source of illumination is spread across the array of optical fibers, it will illuminate not only the cores 6 of the optical fibers 4, but also the cladding layers 7 and the shielding layers 8. Furthermore, the voids 9 between the optical fibers, which are inevitable because of the fibers' round dimensions, also are impacted by the light from the illumination source. All of the light falling upon any element other than the cores 6 is wasted, and becomes an efficiency loss, since it will not be transmitted by the fibers. Additionally, packing the fibers so closely together creates problems such as mechanical difficulties in configuring and accommodating the illumination system and difficulties encountered in attempting to replace one of the individual bundled fibers. This design also typically results in color variation between fibers unless techniques are specifically employed to prevent this problem.

One prior art solution to this problem has been to eliminate the sheathing and cladding layers about each optical fiber, in order to reduce the area across the bundled array of fibers which does not transmit light. However, there is still a packing factor problem because the optical fibers are round, and there are other physical disadvantages in eliminating those layers. Thus, this solution is unsatisfactory for most applications.

What is needed, therefore, is an illumination system which more precisely illuminates only the core of each light pipe, in order to maximize efficiency by preventing light losses. Such a system would also preferably permit the use of spaced, rather than bundled, optical fibers. This is because the whole image of the arc of the lamp is received by each individual fiber, rather than collectively on a bundle of fibers so that each fiber receives a different part of the arc. Spacing the fibers also would assist in maximizing the flexibility and adaptability of the illumination system in terms of application to different environments.

SUMMARY OF THE INVENTION

This invention generally overcomes the problems discussed above and provides other important advantages. With the invention, rather than illuminating the entire optical fiber bundle, only the core of each fiber, which is the sole element capable of transmitting light, is illuminated. Because the whole image of the arc of the lamp is received by each individual fiber, rather than collectively on a bundle of fibers so that each fiber receives a different part of the arc, color variation between fibers is eliminated. By preventing the incidence of light on other optical fiber elements, such as the shielding or cladding layers, as well as the voids between fibers, the efficiency and light output of the illumination system is greatly increased.

Additionally, using the concepts of the invention, it is possible to space the optical fibers, rather than bundling them. Because of this feature, many advantages are realized. Also, many mechanical problems are simplified with spaced fibers. For example, it is much simpler to disconnect and reconnect individual fibers for repair or replacement.

Yet another advantage is that the inventive system permits the controllable allocation of different amounts of light to each fiber. This feature may provide compensation for varying light losses in each optical fiber by controlling the relative quantity of light entering each fiber, so that the light exiting each of the fibers is substantially uniform in intensity, but may also be used for many other purposes.

More particularly, the invention provides an optical fiber manifold for coupling light from an illumination source to a plurality of spaced output fibers, each of which has a core for transmitting light from a proximal end of the fiber to a distal end of the fiber. The manifold comprises a light converging element, which may be either a lens or a reflector, for converging light separately on each of the spaced optical fibers. The light converging element is precise enough that substantially all of the convergent light is received by the respective cores of each of the spaced output fibers, thereby minimizing light loss.

Importantly, the illumination source may comprise a lamp, or alternatively, an input optical fiber adapted to transmit light from an originating source of illumination, such as a lamp. In the latter instance, the optical fiber manifold functions as a splitter to couple the input optical fiber to the plurality of output optical fibers.

In another aspect of the invention, an optical fiber manifold is provided for coupling light from an illumination source to a plurality of output optical fibers, each of which have a proximal end for receiving the light. The manifold comprises a light converging element, which again may comprise either a reflector or a lens, having a plurality of segments. Each segment has a discrete focal point, and the segments are adapted to converge the light from the illumination source to their respective focal points. The proximal end of each of the optical fibers is located at the focal point of a corresponding light converging element segment for receiving light therefrom.

In some embodiments of the invention, the segmented light converging element comprises at least two segments, both of which are located on the same side of the light converging element. However, in other embodiments of the invention the plurality of segments are in substantially radially surrounding relation to the illumination source.

Another important feature of the invention is the ability to vary the light transmitted to each optical fiber. One means disclosed by the invention for accomplishing this is to size the light converging element segments unequally, with each segment being sized to converge the desired amount of light to its corresponding light pipe. Another means is to controllably de-center the light approaching the light converging element. On the other hand, if variance in the quantity of light delivered to each optical fiber is not desired or is unnecessary, all of the light converging element segments may be sized substantially equally and the light need not be de-centered.

Still another important feature of the invention is that the segments of the light converging element may be arranged in abutting structural relationship with the proximal ends of their corresponding output optical fibers. This feature eliminates the losses due to Fresnel reflections at the fiber-to-air interface and the converging element-to-air interface, but requires that the light converging element segments have short internal focal planes, such that the focal point is substantially coincident with the segment exit plane.

When the light converging element comprises a lens, it is preferred in one embodiment that the plurality of segments comprising the segmented lens be arranged circumferentially about a radial center of the lens. Alternatively, the lens may include a radially central lens, with the remaining lens segments being arranged circumferentially about the central lens.

When the light converging element comprises a reflector, it is preferred in one embodiment that the reflector comprise a pair of substantially elliptical reflectors oriented back-to-back, with a portion of each reflector which includes the vertex of that reflector being eliminated, and the illumination source being located substantially centrally with respect to the pair of reflectors. Each reflector thereby comprises a plurality of reflector segments which are each adapted to separately focus light from the illumination source onto the core of a single output optical fiber. In another related embodiment, the reflector surface of the manifold (i.e. the combined reflective surface of each of the two back-to-back reflectors) is substantially circularly symmetric about the optical axis thereof. A pair of output fibers are located on opposite sides of the optical fiber manifold and coaxial with the other of the output fibers and the illumination source along the optical axis. Each of the reflectors are adapted to focus light from the illumination source onto the core of a corresponding one of the output fibers.

The invention, together with additional features and advantages thereof may best be understood by reference to the following description taken in conjunction with the accompanying illustrative drawings.

BRIEF DESCRIPTION OF THE DRAWING

FIG. 5 is a schematic side view of a second alternative embodiment of the invention, illustrating a splitter for coupling light from a first optical fiber to a plurality of branch output optical fibers, using a multi-sectored lens;

FIG. 6 is an end view along lines 6—6 of the multi-sectored lens shown in FIG. 5;

FIG. 9 is an end view of the multi-sectored lens illustrated in FIG. 4; and

FIG. 10 is an end view of the multi-sectored reflector illustrated in FIG. 8.

FIG. 11 is a schematic side view of a fifth alternative embodiment of the invention, illustrating a splitter utilizing a multi-sectored lens;

FIG. 12 is an end view along lines 12—12 of FIG. 11;

FIG. 13 is a schematic side view of a sixth alternative embodiment of the invention, illustrating an illumination source, a multi-sectored reflector, and a plurality of output optical fibers; and FIG. 14 is an end view of the multi-sectored reflector illustrated in FIG. 13.

DESCRIPTION OF THE PREFERRED EMBODIMENT

Figure 1:
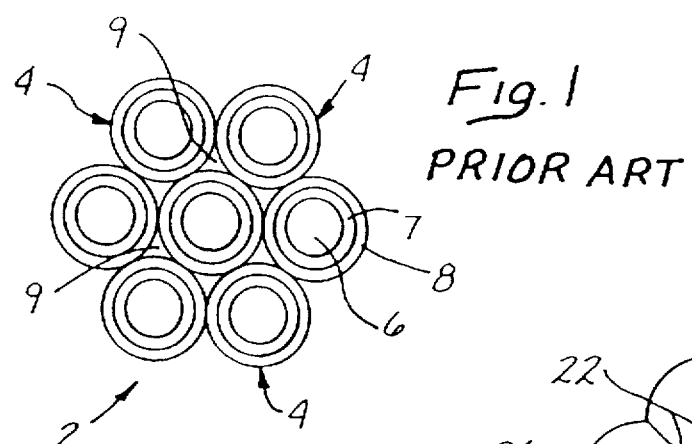
FIG. 1 is a prior art end view of a bundle of large diameter optical fibers, illustrating the structure of each fiber, including sheathing, cladding, and core.
Figure 3:
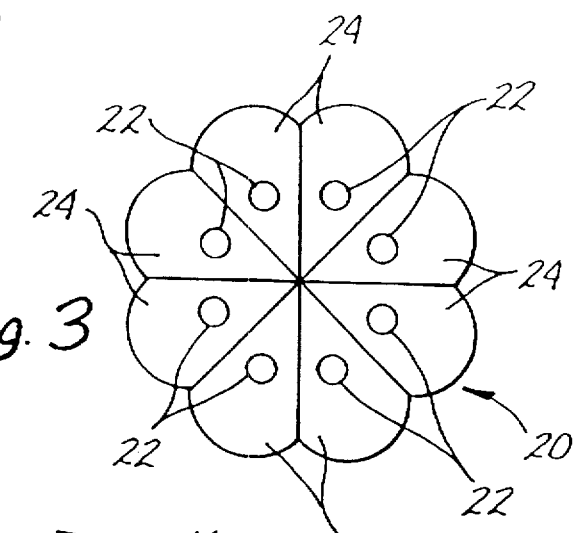
FIG. 3 is an end view along lines 3—3 of the multi-sectored lens shown in FIG. 2.
Figure 2:
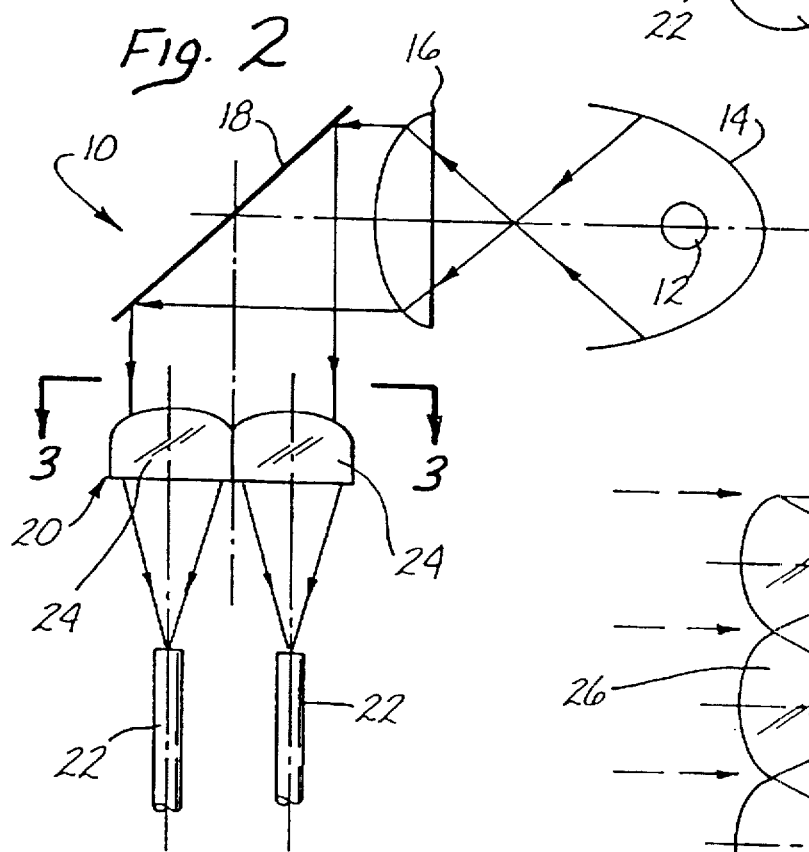
FIG. 2 is a schematic top view of a first embodiment of the invention, illustrating an illumination source, a multi-sectored lens, and a plurality of output optical fibers.

Referring now more specifically to the drawings, FIGS. 2 and 3 illustrate an optical fiber manifold constructed in accordance with the principles of the invention, which includes a source of illumination 12, comprising any conventional light source, such as an arc lamp or the like. An elliptical reflector 14, which in the illustrated embodiment is integral with the lamp 12, reflects the light from the lamp through a collimating lens 16. The light exiting the collimating lens 16 is then reflected by a fold mirror 18 to a scalloped segmented lens 20. The fold mirror 18 may be provided with a cold mirror coating to eliminate any light in the infrared or ultra violet spectra, if desired. The light from the fold mirror 18 is transmitted by the segmented lens 20 to a plurality of spaced output optical fibers 22. An important feature of the invention is that the number of segments or sectors 24 and the number of output fibers 22 correspond. Each lens segment 24 is adapted to converge or focus the light received from the source 12 to a spot at the inlet plane of its corresponding output fiber 22 which has a beamwidth no wider than the fiber core. Thus, each optical fiber 22 receives light only from a single corresponding segment 24, as shown by the ray tracings in FIG. 2. The illustrated preferred embodiment is designed to illuminate eight individual fibers 22, so there are eight segments 24, but the number of segments or fibers may vary. It should be noted that another reflector could be substituted for the elliptical reflector 14, such as a parabolic reflector, in which case the collimating lens 16 would be unnecessary.

One significant feature of the invention is that if the collimated beam approaching the segmented output lens 20 is de-centered with respect to the lens, then the relative intensity to the several output fibers can be varied in a controllable manner. This inventive feature may provide a number of advantages, as there are many instances when there is a need to controllably vary the amount of light to each fiber. For example, the ability to controllably allocate different amounts of light to each fiber may provide a means for compensating for light loss through fibers of different lengths coming from the same coupler manifold. Thus, if it is desired to illuminate spaced lamps along a hallway from a single central illumination source, then fibers of different lengths must be used to couple the illumination to each of the hallway lamps. Because of varying losses, the hallway lamps would each be at a different intensity if the losses could not be compensated for in some manner. The ability to de-center the collimated beam in a controllable manner would provide one means for compensating for these varying losses, and to ensure uniform light intensity from each lamp.

Figure 4:
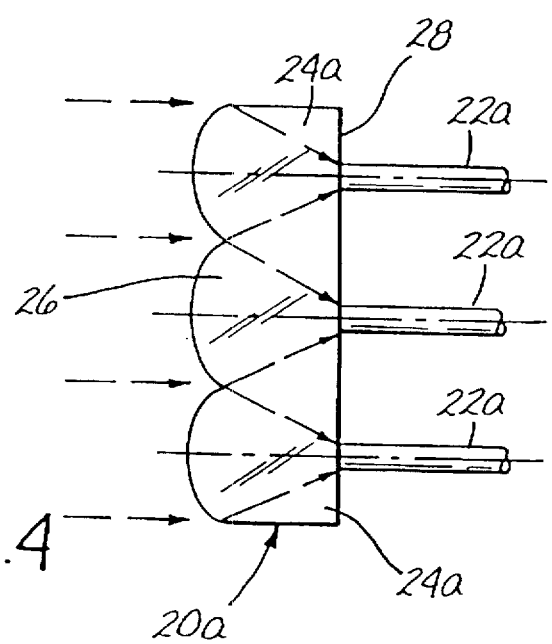
FIG. 4 is a schematic side view of an alternative embodiment of the invention, illustrating a multi-sectored lens and a plurality of output optical fibers, wherein each output optical fiber is in abutting relationship with a corresponding lens sector.

FIGS. 4 and 9 illustrate an alternative embodiment of the invention shown in FIG. 2, wherein like components are designated by the same reference numeral, followed by the letter "a". The segmented lens 20a comprises an array of outer segments 24a, as well as a central lens 26. Each lens segment 24a, as well as the central lens 26, correspond to an output optical fiber 22a, in the same manner shown and described in FIG. 2. The employment of a central lens is sometimes advantageous in that the outer segment lenses consequently have a smaller diameter, resulting in the ability to couple into smaller output fibers 22a.

Another difference between lens 20a and lens 20 of FIG. 2 is that, in contrast to the lens 20, the lens 20a comprises asymmetrical, rather than symmetrical, outer lens segments 24a. This asymmetrical distribution provides an additional advantageous means for controllably varying the light intensity transmitted to each output fiber 22a. Each lens segment 24a subtends a different angle, and therefore different areas of incident light, so consequently delivers to its corresponding output fiber a quantity of light proportionate to its size. Thus, the asymmetrical lens segment distribution illustrated in FIG. 9 permits control of the light intensity to each output fiber without de-centering the collimated beam, by instead determining the lens segment size which will be required for each output fiber, relative to the sizes required for the other output fibers, and sizing each lens segment accordingly.

Yet another difference between the lens 20a of FIG. 4 and the lens 20 of FIG. 2 is that the lens 20a is adapted to directly abut the output fibers 22a at a lens/optical fiber joint 28 (FIG. 4). This is an important advantage, in that it minimizes the light losses due to Fresnel reflections from the segmented lens 20a to the output fibers 22a. To be possible, a segmented lens 20a is required wherein each segment has a short, internal focal length, so that the light to be transmitted to each output fiber is focused at the exit plane of the lens to a beamwidth which is no greater than the diameter of the fiber core.

Of course, it should be understood by one of ordinary skill in the art that each of the advantageous features discussed in connection with the FIG. 4 embodiment could be employed independently of the other features, or in combination with only one of the other features, as desired.

FIGS. 5 and 6 illustrate yet another alternative embodiment of the invention, wherein like components are designated by the same reference numeral, preceded by the numeral 1. The inventive optical fiber manifold 110 comprises a splitter, coupling light from a source comprising a large single fiber 112 through a collimating lens 116 and a segmented lens 120 to a number of smaller output fibers 122. In this embodiment, the collimating lens 116 comprises a hyper-hemispherical lens having an aplanatic spherical surface with zero spherical aberration and coma, and is affixed directly to the source fiber 112. Of course, another type of collimating lens, such as that shown in FIG. 2, could be used as well. Also, it should be noted that in this embodiment, as in the other lens embodiments of FIGS. 2 and 4, each segment 124 of the segmented lens 120 preferably has a spherical or aspheric lens surface 130, for the purpose of minimizing distortion.

Figure 7:
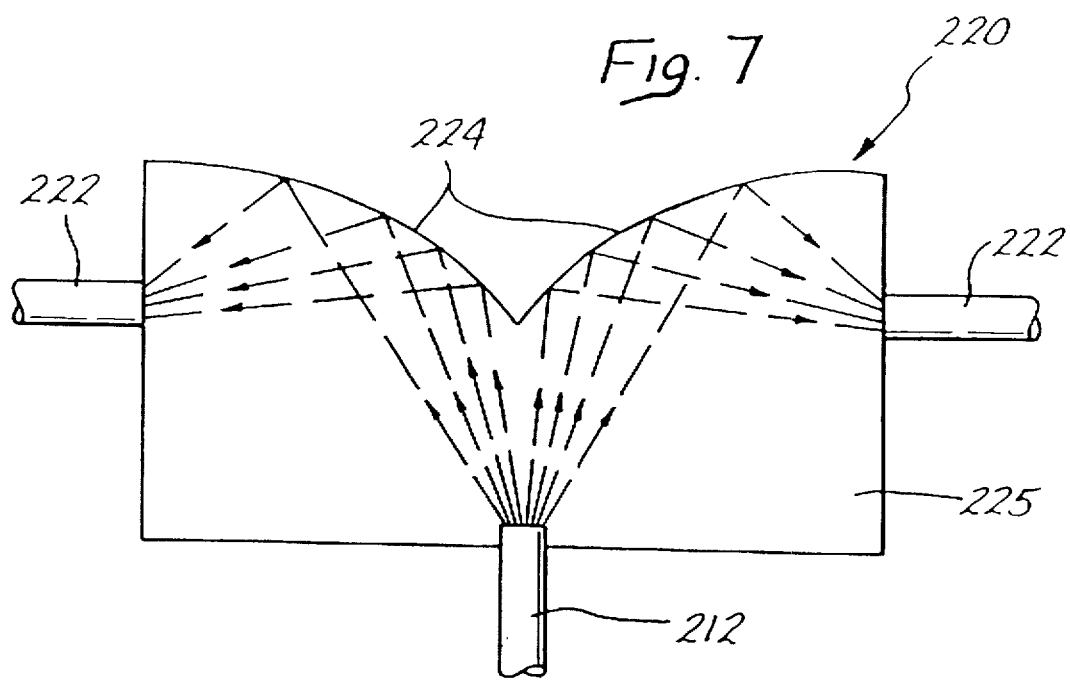
FIG. 7 is a schematic top view of a third alternative embodiment of the invention, illustrating a splitter for coupling light from a first optical fiber to a plurality of branch output optical fibers, using a multi-sectored reflector.

FIG. 7 shows a splitter embodiment similar to that illustrated in FIG. 5, wherein like components are designated by the same reference numeral, preceded by the numeral 2. The primary difference between the two embodiments is that a segmented reflector 220, rather than a segmented lens, is employed to couple the light from a large diameter source fiber to a plurality of smaller diameter output or branch fibers 222. In this embodiment, each segment 224 is created by "cutting" the surface of the reflector (which is preferably elliptical) into sections, and rotating each section about the axis of the source fiber 212, so that the focal point of each section is off-axis. A corresponding output fiber 222 is then located at the focal point to receive the light collected by that section, which is focused to a single spot so that only the core of the corresponding fiber optic 222 is illuminated. The manifold is preferably contained in a housing 225, fabricated of clear plastic, though other materials could be used as well. Although two segments 224 and branch fibers 222 are illustrated, any number of both could be employed, though they should preferably correspond. Also, as in the case of the segmented lens, the segments 224 may be symmetrical or asymmetrical, depending upon the application and the desired controllability of the illumination intensity to each output fiber. If it is desired to locate one or more of the output fibers in an orientation different than that shown, such as in a generally parallel orientation to that of the source fiber, one or more fold mirrors may be employed to re-orient the reflected light.

Figure 8:
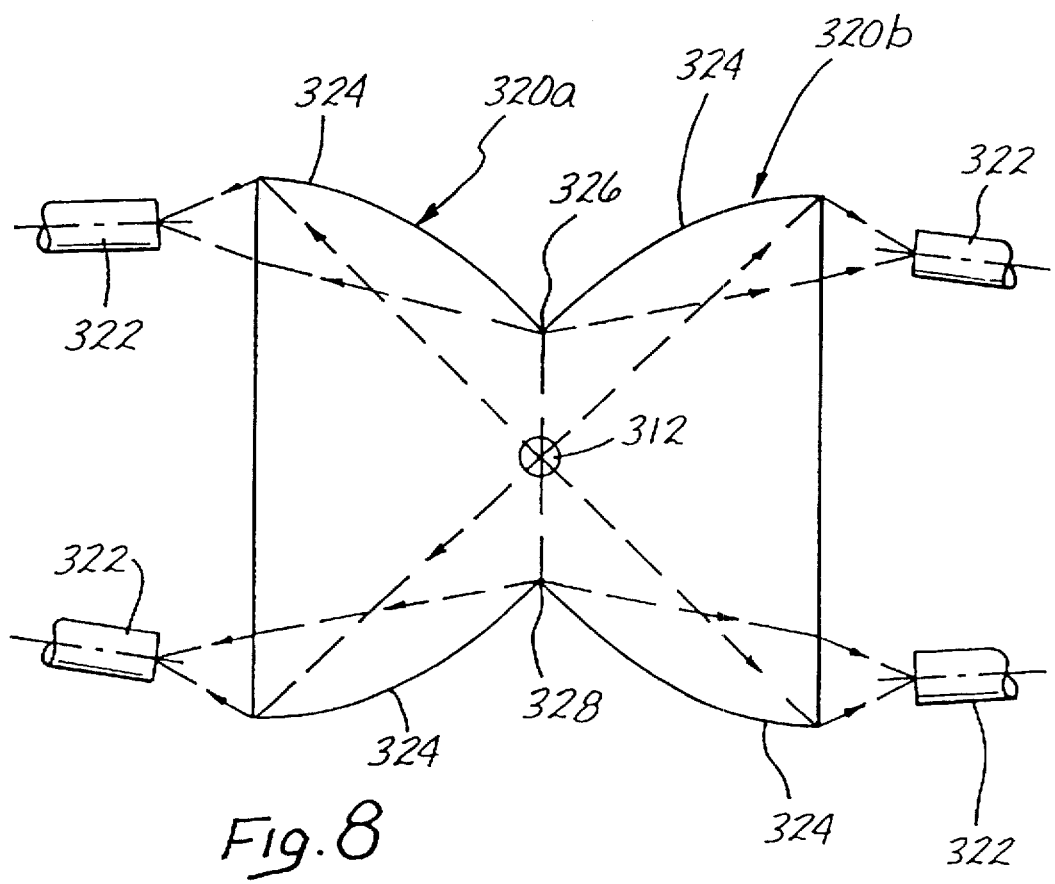
FIG. 8 is a schematic side view of a fourth alternative embodiment of the invention, illustrating an illumination source, a multi-sectored reflector, and a plurality of output optical fibers.

FIGS. 8 and 10 illustrate another alternative embodiment wherein like components to those of previous embodiments are designated by the same reference numeral, preceded by the numeral 3. In this embodiment, a segmented reflector array is utilized to couple the light from a source to a plurality of output fibers. A source of illumination 312, which may, for example, comprise an arc lamp, is located at the common center of two reflectors 320a and 320b, which are oriented back-to-back. Output fibers 322 are arranged in surrounding relationship to the illumination source 312 to receive light from the reflectors 320a and 320b, which together comprise a plurality of segments 324, each of which corresponds with one of the output fibers. The elliptical center or vertex region of each reflector 320a and 320b is removed, as shown, and the two reflectors are joined at two intersection points 326 and 328.

By using back-to-back reflectors around a lamp 312, a high degree of collection angle can be achieved, with relatively low magnification, because the vertex of the reflector (which produces the highest magnification) is eliminated. By reducing magnification, a smaller spot size can be achieved without increasing the angles of the light directed to the spot. This is ideal for converging energy onto the core of a relatively small fiber.

Again, in this design, any number of fold mirrors may be employed to re-direct the reflected light, if desired. Additionally, while eight output fibers 324 are shown, any number of segments and fibers could be employed within the scope of the invention. As in all of the disclosed embodiments, the output fibers are spaced, which improves adaptability of the system to numerous applications over prior art systems where bundling of the output fibers is required. Also, spacing the fibers greatly enhances thermal dissipation characteristics of the fibers.

Still another alternative embodiment is shown in FIGS. 11 and 12, wherein like components to those of previous embodiments are designated by the same reference numeral, preceded by the numeral 4. In this embodiment, the optical fiber manifold 410 comprises a splitter similar to that shown in FIG. 5, which couples light from a source comprising a large single fiber 412 through a collimating lens 416 and a segmented lens 420 to a number of smaller output fibers 422. The primary difference between this embodiment and that of FIG. 5 is that in the FIG. 10 embodiment, the segmented lens 420 includes tapered light pipe (optical fiber) extensions 423 at the output end of the lens segments 424. The tapered light pipe sections of the output lens system generate a significant part of the light beam compression. Therefore, a less severely curved aspheric lens surface 430 may be used at the front end of the lens 420. This reduces lens surface aberrations and allows higher optical compression or "gain" to be achieved. The inventive configuration also has a tangential benefit of reducing the volume of plastic in the lens and eases molding.

A sixth alternative embodiment is illustrated in FIGS. 13 and 14, wherein like components to those of previous embodiments are designated by the same reference numeral, preceded by the numeral 5. In this embodiment, which is similar to that illustrated in FIG. 8, a segmented reflector array is utilized to couple the light from a source to a pair of coaxial output fibers. More specifically, a source of illumination 512 is located at the common center of two reflectors 520a and 520b, which are oriented back-to-back. Output fibers 522 are located coaxially with the illumination source 512 along the optical axis 523 of the optical fiber manifold 510. The primary difference between the FIG. 13 and FIG. 8 embodiments is that the reflector surface is circularly symmetric about the optical axis 523, as illustrated in FIG. 14, rather than scalloped. The reflectors are adapted to equally illuminate the two fibers 522 for applications such as automobile headlights or for lighting opposite ends of a long hallway. In the embodiment illustrated, the reflected light travels through the output fibers 522 and then is focused by a beam focusing lens 525 onto the element desired to be illuminated. The dual reflector surface has the same efficiency advantages as discussed with respect to the FIG. 8 embodiment; i.e. elimination of the high magnification vertex region of the two reflectors with the attendant improved concentration of light onto the fibers.

Although exemplary embodiments of the invention have been shown and described, many changes, modifications, and substitutions may be made by one having ordinary skill in the art without necessarily departing from the spirit and scope of this invention.

What is claimed is:

1. An optical fiber manifold for coupling light from an illumination source to a plurality of spaced output optical fibers, each of which has a proximal end for receiving said light, and a core having a diameter of at least about 1 mm for transmitting light from the proximal end to a distal output end, said manifold comprising a lens for converging said light separately on the core of each of the optical fibers, light exiting from the output end of each of said optical fibers to illuminate a space remote from said illumination source, said lens comprising a plurality of segments, each having a first surface receptive of light from said illumination source and also having a second surface, each of said lens segments further being adapted to transmit light from the second surface and focus said light on the proximal end of a corresponding one of said optical fibers.

2. An optical fiber manifold as recited in claim 1, wherein said illumination source comprises a lamp.

3. An optical fiber manifold as recited in claim 1, and further comprising a fold mirror for angularly deflecting the light transmitted through said optical fiber manifold.

4. An optical fiber manifold as recited in claim 1, wherein said illumination source comprises an input optical fiber adapted to transmit light from an originating source of illumination, such that said optical fiber manifold comprises a splitter for coupling said input optical fiber to said plurality of output optical fibers.

5. An optical fiber manifold as recited in claim 1, and further comprising a collimating lens for collimating the light from said illumination source.

6. An optical fiber manifold for coupling light from an illumination source to a plurality of output optical fibers, said output optical fibers each having a proximal end for receiving said light and said manifold comprising a lens having a plurality of segments which each have a discrete focal point, wherein said segments are adapted to converge the light from said illumination source to their respective focal points, the proximal end of each of said optical fibers being located at the focal point of a corresponding lens segment for receiving light therefrom, each of said optical fibers having a core with a diameter of at least about 1 mm, and an output end from which said light exits to illuminate a space remote from said illumination source.

7. An optical fiber manifold as recited in claim 6, wherein the segmented lens comprises at least two segments, which are both located on the same side of said illumination source.

8. An optical fiber manifold as recited in claim 6, wherein said plurality of segments are arranged in a substantially radially surrounding relationship to said illumination source.

9. An optical fiber manifold as recited in claim 6, wherein each of said lens segments are substantially equal in size.

10. An optical fiber manifold as recited in claim 6, wherein the lens segments are unequally sized, each said light converging element segment being sized to compensate for varying loss factors in the optical fibers such that the light exiting from the output optical fibers is adapted to have a substantially uniform intensity.

11. An optical fiber manifold as recited in claim 6, wherein said illumination source comprises an input optical fiber adapted to transmit light from an originating source of illumination, such that said optical fiber manifold comprises a splitter, for coupling said input optical fiber to said plurality of output optical fibers.

12. An optical fiber manifold as recited in claim 6, wherein the light approaching said lens may be de-centered to controllably vary light to each fiber.

13. An optical fiber manifold as recited in claim 12, wherein said lens segments are adapted to be in abutting structural relationship with the proximal ends of their corresponding output optical fibers, whereby the focal point of each lens segment is substantially coincident with its exit plane.

14. A centralized lighting system having multiple outputs for distributing light output to a plurality of remote locations, said lighting system comprising:

a high brightness light source;

a reflector member for directing light from said light source;

a plurality of lens members located in a common place, each having a first surface receptive of light from said light source and said reflector member, said plurality of lens members further each having a second surface, means including said plurality of lens members being effective so as to focus said light from said light source and said reflector member into focussed light outputs;

a plurality of optical fibers, each having a diameter of at least about 1 mm, and being receptive of said focussed light outputs and effective so as to deliver light to one of said remote locations; and wherein said plurality of lens members are disposed at a spaced apart relation to said reflector member, said lens members, so arranged, being effective so as to provide a plurality of spatially separated light output spots to said plurality of optical fibers.

15. The centralized lighting system as set forth in claim 14 wherein said plurality of lens members are disposed relative to one another so that at least a portion of each lens member contacts at least another portion of at least one other lens member.

16. The centralized lighting system as set forth in claim 15 wherein said portions of said lens members that contact one another are tapered so as to securely fit adjacent one another thereby substantially eliminating spaces formed therebetween.

17. The centralized lighting system as set forth in claim 14 wherein said means to focus said light includes a turning mirror disposed between said reflector member and said plurality of lens members, said turning mirror being effective so as to redirect light thereto.

18. The centralized lighting system as set forth in claim 14 wherein said plurality of optical fibers are disposed in non-contacting relation to one another and said spatially separated light output spots are associated with said plurality of optical fibers on a one to one basis thereby avoiding packing fraction losses by said optical fibers.

19. The centralized lighting system as set forth in claim 14 further comprising at least one headlamp reflector assembly in which output ends of at least two of said plurality of optical fibers terminate so as to deliver light output thereto.

20. The centralized lighting system as set forth in claim 19 wherein said headlamp reflector assembly includes a V-shaped mirror member receptive of light output from said output ends of said at least two optical fibers, said V-shaped mirror being effective so as to direct such light output to a curved reflector member which serves to spread such light output into a desire beam pattern for delivery through a lens member.

21. A centralized lighting system having multiple outputs for distributing light output to a plurality of remote locations, said lighting system comprising:

a high brightness light source;

a plurality of lens members disposed in a common plane and in a spaced apart relation to said light source and receptive of light directed from said light source, said plurality of lens members being effective so as to focus said light from said light source into a plurality of spatially separated light output spots;

a plurality of optical fibers, each one having a diameter of at least about 1 mm and being receptive of one of said spatially separated light output spots and effective so as to deliver light to said remote locations; and wherein said plurality of optical fibers are disposed in a non-contacting relation to one another.

22. The centralized lighting system as set forth in claim 21 wherein said plurality of lens members are disposed relative to one another so that at least a portion of each lens member contacts at least another portion of at least one other lens member.

23. The centralized lighting system as set forth in claim 22 wherein said portions of said lens members that contact one another are tapered so as to securely fit adjacent one another thereby substantially eliminating spaces formed therebetween.

24. The centralized lighting system as set forth in claim 21 further comprising at least one headlamp reflector assembly in which output ends of at least two of said plurality of optical fibers terminate so as to deliver light output thereto.

* * * * *